(12) United States Patent
Bernardi et al.

(10) Patent No.: US 7,931,232 B2
(45) Date of Patent: Apr. 26, 2011

(54) RIGID FRAMEWORK FOR AIRCRAFT ENGINE MOUNTING STRUCTURE AND ENGINE MOUNTING STRUCTURE COMPRISING SAME

(75) Inventors: Lionel Bernardi, Bannieres (FR); Thierry Huguet, Brax (FR)

(73) Assignee: Airbus France, Toulouse (FR)

( * ) Notice: Subject to any disclaimer, the term of this patent is extended or adjusted under 35 U.S.C. 154(b) by 490 days.

(21) Appl. No.: 12/067,944

(22) PCT Filed: Oct. 5, 2006

(86) PCT No.: PCT/EP2006/067069
§ 371 (c)(1),
(2), (4) Date: Mar. 25, 2008

(87) PCT Pub. No.: WO2007/042453
PCT Pub. Date: Apr. 19, 2007

(65) Prior Publication Data
US 2008/0251634 A1    Oct. 16, 2008

(30) Foreign Application Priority Data
Oct. 7, 2005  (FR) ................................. 05 53055

(51) Int. Cl.
B64D 27/00 (2006.01)
(52) U.S. Cl. .............. 244/54; 60/796; 60/797; 248/554; 248/557

(58) Field of Classification Search .................... 244/54; 60/796, 797; 248/554, 557
See application file for complete search history.

(56) References Cited

U.S. PATENT DOCUMENTS

| | | | | | |
|---|---|---|---|---|---|
| 3,357,657 | A | * | 12/1967 | Ferrel et al. ..................... | 244/54 |
| 4,917,331 | A | * | 4/1990 | Hager et al. .................... | 244/54 |
| 5,054,715 | A | * | 10/1991 | Hager et al. .................... | 244/54 |
| 6,095,456 | A | * | 8/2000 | Powell ............................ | 244/54 |
| 6,131,850 | A | * | 10/2000 | Hey et al. ....................... | 244/54 |
| 7,104,306 | B2 | * | 9/2006 | Huggins et al. ................. | 164/47 |
| 7,398,945 | B2 | * | 7/2008 | Huggins et al. ................. | 244/54 |
| 2005/0082423 | A1 | | 4/2005 | Whitmer et al. | |
| 2005/0274485 | A1 | * | 12/2005 | Huggins et al. ............... | 164/349 |
| 2007/0108341 | A1 | * | 5/2007 | Diochon et al. ................ | 244/54 |
| 2007/0120010 | A1 | * | 5/2007 | Huggins et al. ................ | 244/54 |
| 2007/0228213 | A1 | * | 10/2007 | Diochon et al. ................ | 244/54 |

FOREIGN PATENT DOCUMENTS
EP             0 429 100           5/1991

* cited by examiner

*Primary Examiner* — Tien Dinh
*Assistant Examiner* — Philip J Bonzell
(74) *Attorney, Agent, or Firm* — Oblon, Spivak, McClelland, Maier & Neustadt, L.L.P.

(57) ABSTRACT

A rigid structure of a suspension pylon for an aircraft engine, which is in a shape of a box closed by first and second box side panels. The structure includes inter-rib spaces, each space delimited by two directly consecutive box transverse ribs. For each inter-rib space forming part of a group including at least three arbitrary and directly consecutive inter-rib spaces, a single access opening is provided on the side panels, the openings arranged alternately on the first and second side panels.

8 Claims, 3 Drawing Sheets

RIGID FRAMEWORK FOR AIRCRAFT ENGINE MOUNTING STRUCTURE AND ENGINE MOUNTING STRUCTURE COMPRISING SAME

TECHNICAL DOMAIN

This invention relates in general to a suspension pylon for an engine designed to be inserted between the wing of an aircraft and the engine concerned, and a rigid structure of such a pylon, also called the rigid primary structure.

The invention may be used on any aircraft type equipped with turbojets or turboprops.

This type of suspension pylon or EMS (Engine Mounting Structure), can be used to suspend a turbojet below the aircraft wing, or to mount this turbojet above this wing.

STATE OF PRIOR ART

On existing aircraft, turbo-engines are suspended below the wing by complex mounting devices, also called suspension pylons. For turbojets, the suspension pylons usually used comprise a rigid box structure, in other words formed by the assembly of side panels and upper and lower spars connected to each other through a plurality of transverse ribs.

In a known manner, these pylons are designed particularly to transmit static and dynamic forces generated by the turbo-engines such as the weight, thrust or the different dynamic forces, to the wing.

The rigid structure forming a box is usually provided with a plurality of access openings formed on the side panels of the box, these openings also being called manholes or inspection holes through which an operator can access the inside of the box for assembly or maintenance operations. Conventionally, in a manner known to those skilled in the art, these openings are usually sized so that an operator's arm can pass through them.

It should be noted that the presence of an access opening on a side panel creates a penalty in terms of the mass, because it necessarily means that the side panel concerned has to be oversized such that the complete rigid assembly can fulfil its primary function which is to transfer forces from the engine. Therefore, an attempt has been made to find a design that minimises the number of access openings to be provided along the side panels, while allowing satisfactory access inside the rigid structure and its different inter-rib spaces, each space being delimited by adjacent ribs along the longitudinal direction of the rigid structure.

It was thus proposed to arrange these access openings such that their planes of symmetry are the median vertical and longitudinal planes of the rigid structure. Furthermore, access openings are usually arranged to provide direct access to only one out of two directly consecutive inter-rib spaces, to limit mass constraints related to their presence. Consequently, the second of these two inter-rib spaces can only be accessed indirectly by an operator who would like to perform assembly and maintenance operations in them, through access openings to the adjacent space and the internal passage defined by the transverse rib separating these two spaces.

Thus, with this arrangement, it is clear that it is relatively difficult for operators to access inter-rib spaces in the box that are not provided with access openings.

Secondly, with this arrangement, the mechanical strength of the entire box-shaped rigid structure is significantly reduced at the portions containing two symmetric access openings providing direct access to the same inter-rib space, which inevitably leads to side panels being correspondingly further oversized, which is very penalizing in terms of the global mass of the box.

OBJECT OF THE INVENTION

Therefore, the purpose of the invention is to suggest a rigid structure for an aircraft engine suspension pylon that overcomes the disadvantages encountered in structures according to prior art.

More precisely, the purpose of this invention is to disclose a rigid structure for an aircraft engine suspension pylon for which the arrangement of access openings on the side panels simultaneously enables a better global mechanical strength of the rigid structure, a smaller number of openings to be provided on the side panels, and easier access to the entire box compared with what was done with embodiments according to prior art.

To achieve this, the object of the invention is a rigid structure of an aircraft engine suspension pylon, the rigid structure being in the form of a box closed on one side by a first box side panel and on the other side by a second box side panel, this rigid structure also comprising transverse ribs connecting the two side panels and located at a spacing from each other along the longitudinal direction of the rigid structure, and a plurality of inter-rib spaces, each space being delimited by two directly consecutive transverse ribs, the first and second side panels being provided with access openings into the inside of the box. According to the invention, a single access opening in the side panels is provided for each inter-rib space belonging to a group comprising at least three arbitrary and directly consecutive inter-rib spaces in the rigid structure, these access openings being arranged alternately on the first and the second side panels of the rigid structure.

Thus, it can be understood that the structure according to the invention is innovative in that it no longer provides direct access to only one inter-rib space out of two consecutive spaces, but rather to all spaces in the group considered. This advantageously facilitates access to the entire box, because each inter-rib space can then be accessed directly from a single opening, by an operator who wants to perform maintenance or assembly operations inside the box.

Furthermore, with the proposed configuration, it is possible to have better global mechanical strength of the rigid structure, because of the alternating (staggered) layout of the openings, there are never two side access openings in the same cross-section of the structure, although this was the case in embodiments according to prior art. Consequently, stresses in the side panels are better distributed, which reduces oversizing and can therefore significantly reduce the global mass of the side panels.

Finally, it should be noted that the selected staggered arrangement means that the number of access openings in the side panels can be reduced by one in comparison with embodiments according to prior art, for the same number of inter-rib spaces. As an illustrative example, for three directly consecutive inter-rib spaces, structures according to prior art would require two openings for the first space, no openings for the second space, and two other openings for the third inter-rib space, giving a total of four access openings. On the other hand, the invention requires a single opening for each of the three spaces, therefore giving a total of three access openings.

This reduction in the number of openings for a given segment of the rigid structure also results in a mass saving, also due to the fact that the presence of an access opening on a side panel causes oversizing leading to an increase in the mass.

Preferably, the group comprising at least three arbitrary and directly consecutive inter-rib spaces is composed of at least eight inter-rib spaces, but obviously this number could be larger. Moreover, it is also possible that the group could include all inter-rib spaces in the rigid structure, without going outside the framework of this invention.

More generally, it would be possible for the group comprising at least three arbitrary and directly consecutive inter-rib spaces to include at least 60% of all inter-rib spaces formed in the rigid structure.

Preferably, each access opening is circular in shape and has a radius larger than 200 mm, this value being quite suitable to allow the passage of an operator's arm.

Also preferably, the rigid structure also comprises an upper spar and a lower spar, and at least one of these two spars is provided with at least one access opening allowing access to the inside of the box.

Finally, another purpose of the invention is an aircraft engine suspension pylon comprising a rigid structure like the structure that has just been described.

Other advantages and characteristics of the invention will become clear by reading the non-limitative detailed description given below.

BRIEF DESCRIPTION OF THE DRAWINGS

This description will be made with reference to the appended figures wherein.

DETAILED DESCRIPTION OF PREFERRED EMBODIMENTS

Figure 1:
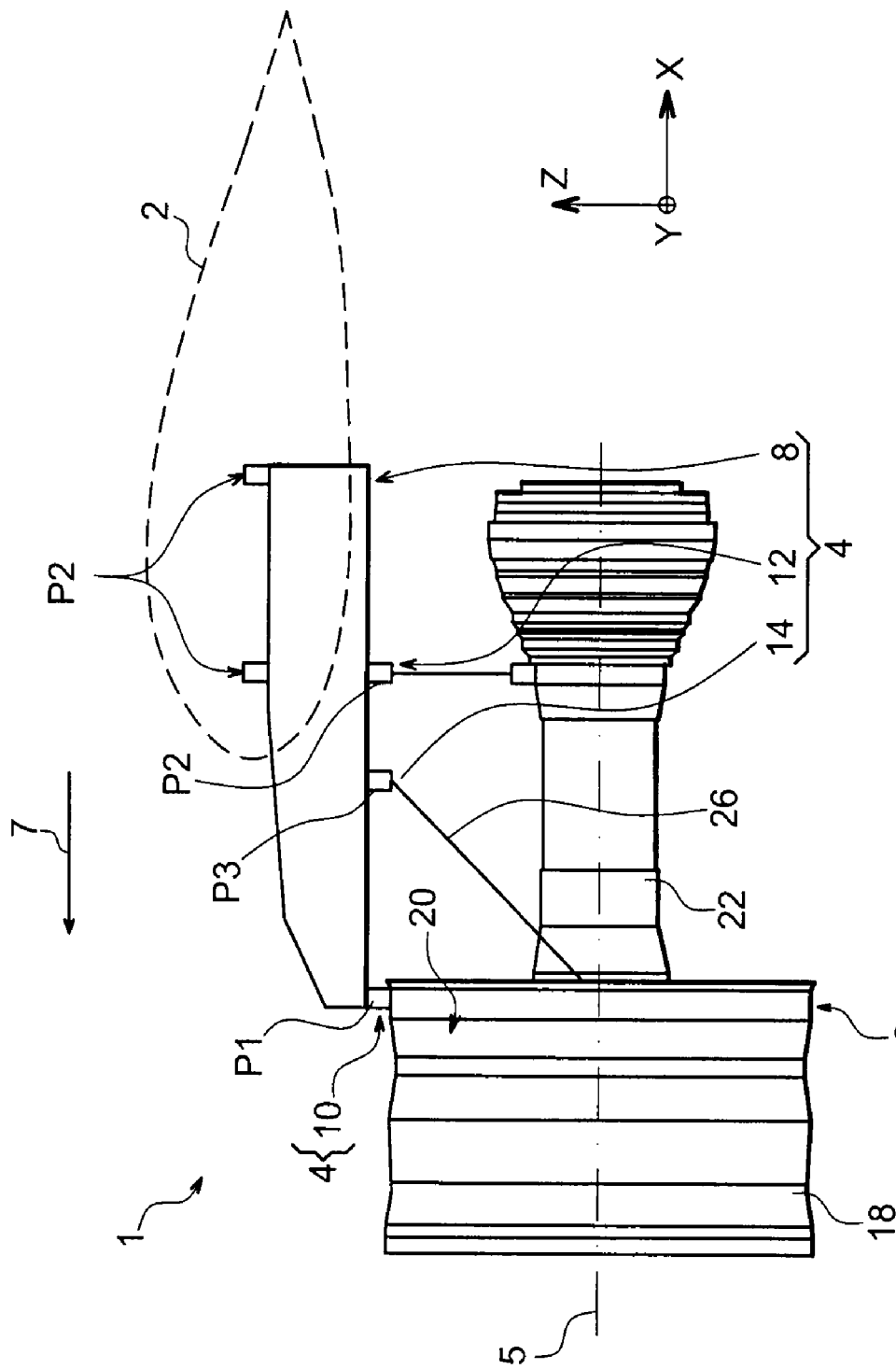
FIG. 1 shows a diagrammatic side view of an assembly for an aircraft, comprising an engine suspension pylon according to a preferred embodiment of this invention.

FIG. 1 shows an aircraft engine assembly 1 designed to be fixed under a wing 2 of this aircraft shown only diagrammatically in dashed lines for reasons of clarity, this assembly 1 comprising a suspension pylon 4 according to a preferred embodiment of this invention, and an engine 6 such as a turbojet suspended under this pylon 4.

Globally, the suspension pylon 4 comprises a rigid structure 8 or primary structure, suspension means of the engine 6 provided with a plurality of engine suspensions 10, 12, and a device 14 for resisting thrusts generated by the engine 6.

For information, it should be noted that the assembly 1 is designed to be surrounded by a pod (not shown) and the suspension pylon 4 is fitted with another series of suspensions 16 used to suspend this assembly 1 under the aircraft wing 2.

Throughout the following description, by convention, X refers to the longitudinal direction of the pylon 4 that is also considered to be the same as the longitudinal direction of the turbojet 6, this X direction being parallel to a longitudinal axis 5 of this turbojet 6. Furthermore, the direction transverse to the pylon 4 is called the Y direction and can also be considered to be the same as the transverse direction of the turbojet 6, and Z is the vertical direction or the height, these three X, Y and Z directions being orthogonal to each other.

Furthermore, the terms <<forward>> and <<aft>> should be considered with respect to a direction of motion of the aircraft that occurs as a result of the thrust applied by the turbojet 6, this direction being shown diagrammatically by the arrow 7.

FIG. 1 shows the two engine suspensions 10, 12, the series of suspensions 16, the thrust resistance device 14, and the rigid structure 8 of the suspension pylon 4. The other constituents not shown of this pylon 4, such as the secondary structure segregating and holding the systems while supporting aerodynamic fairings, are conventional elements identical to or similar to those used in prior art, and known to those skilled in the art. Consequently, no detailed description of them will be made.

Furthermore, the turbojet 6 is provided with a large dimension fan casing 16 at the forward end delimiting an annular fan duct 20 and comprises a smaller central casing 22 towards the aft and containing the core of this turbojet. Casings 18 and 20 are obviously fixed to each other.

As can be seen in FIG. 1, there are two engine suspensions 10, 12 on the device 4, called the forward engine suspension and the aft engine suspension respectively.

The suspension means used in this preferred embodiment comprise firstly the forward engine suspension 10 inserted between a forward end of the rigid structure 8 also called the pyramid, and an upper part of the fan casing 18. The forward engine suspension 10, designed conventionally in a manner known to those skilled in the art, is fixed at a first point P1 on the rigid structure 8.

Furthermore, the after engine suspension 12, also made conventionally and in a manner known to those skilled in the art, is inserted between the rigid structure 8 and the central casing 22, and is fixed at a second point P2 on the rigid structure 8 placed aft from the point P1.

The thrust resistance device 14 is preferably fixed at a third point P3 on the rigid structure 8, the point P3 being located between the two points P1 and P2. In this respect, it should be noted that the three above-mentioned points preferably belong to a vertical median plane of the suspension pylon (not shown).

Globally, the thrust resistance device 14 uses a conventional design familiar to those skilled in the art, namely it has two lateral thrust resisting rods 26 (only one of which can be seen in FIG. 1), each of these rods comprising a forward end connected to the fan casing 18, for example on or close to a median plane of the turbojet 6. Secondly, their aft end is connected in an articulated manner to a spreader beam (not shown) added onto the rigid structure 8.

This rigid structure 8 is globally in the form of a box extending forwards from the aft end, approximately along the X direction.

Figure 2:
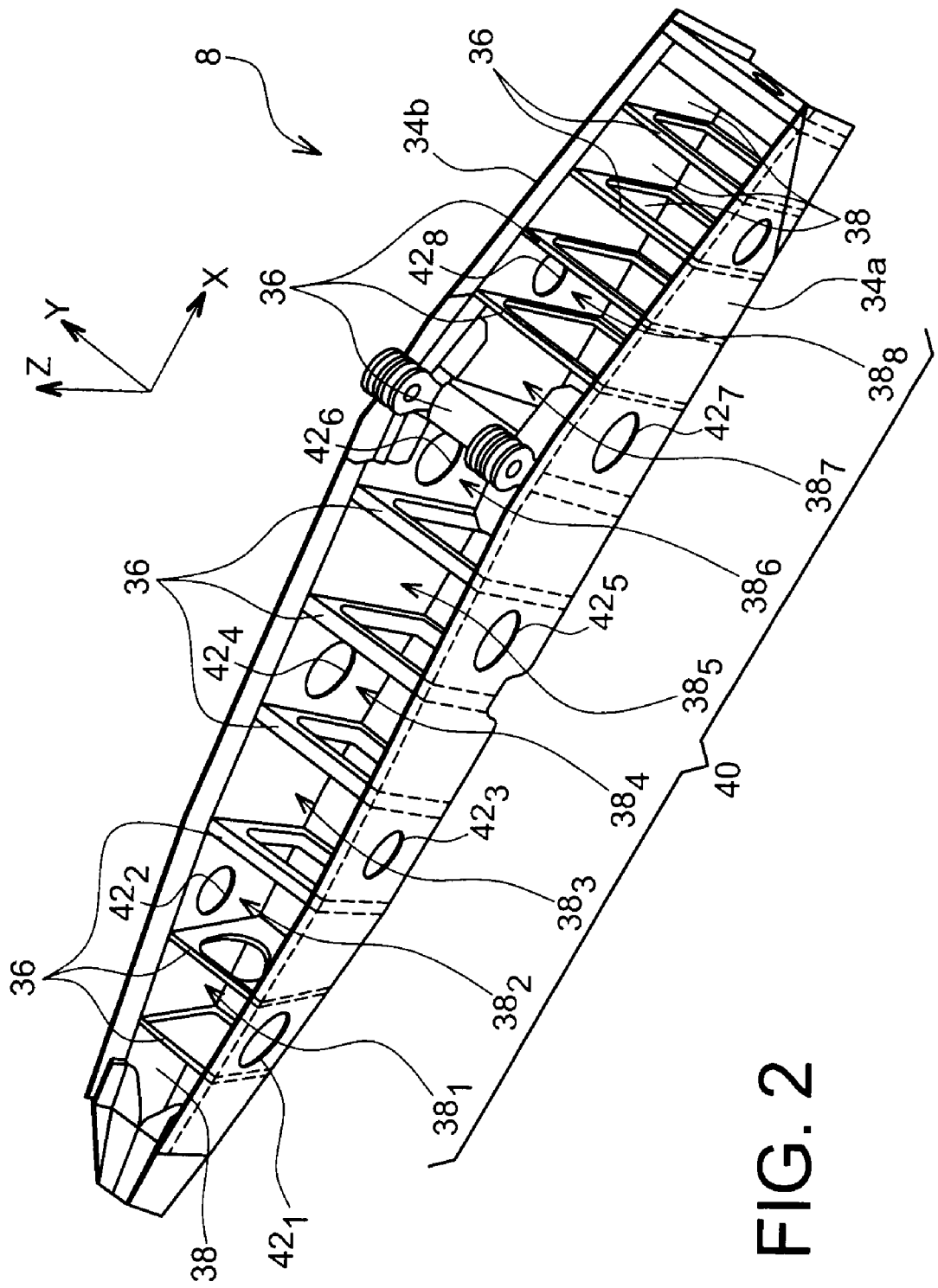
FIGS. 2 and 3 show detailed perspective views of the rigid structure of the suspension pylon shown in FIG. 1.
Figure 3:
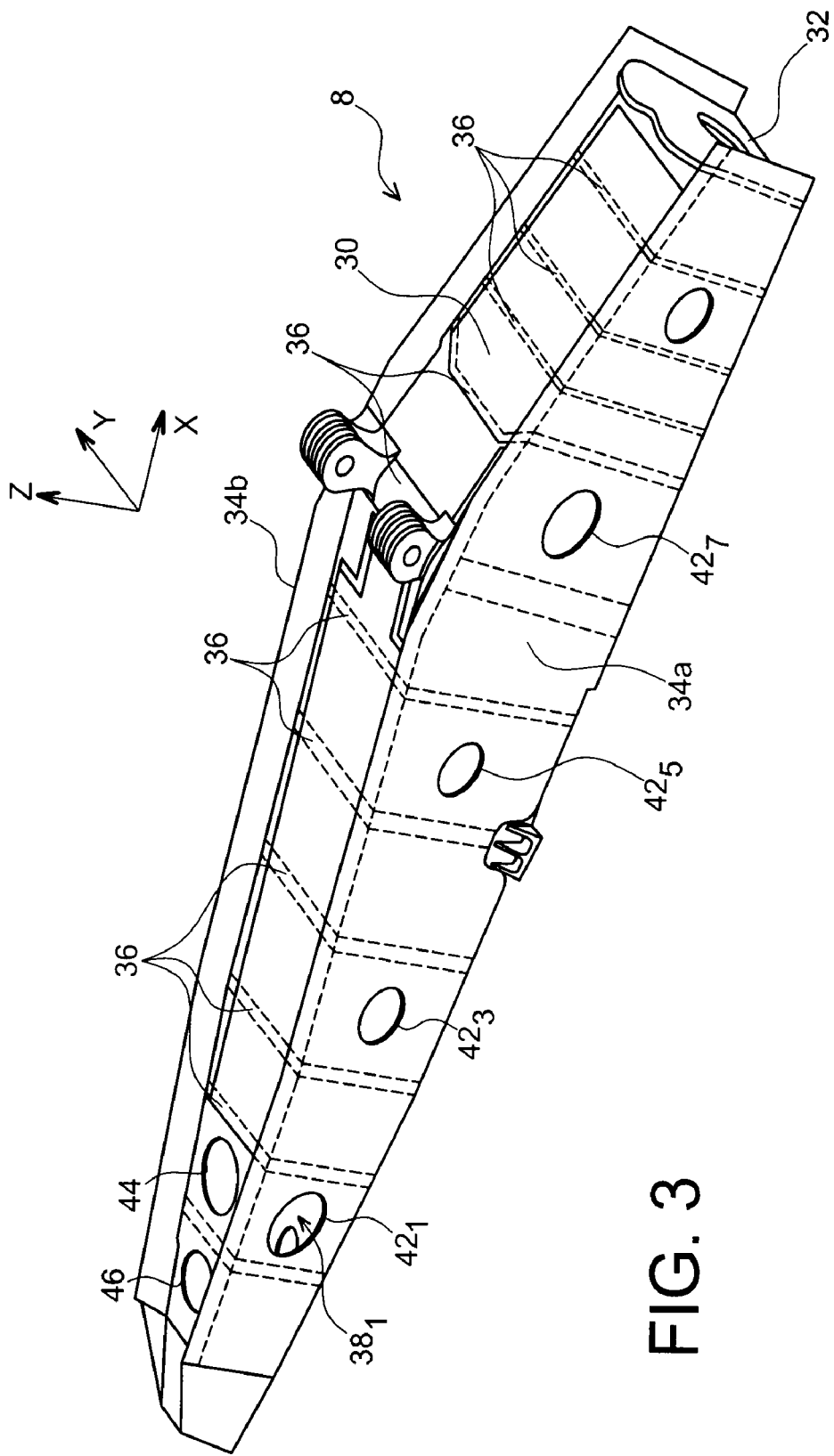

More precisely, with reference to FIGS. 2 and 3 showing the rigid structure 8 according to this invention in more detail, it can be seen that it is made by the conventional assembly of an upper spar 30, a lower spar 32, a first box side panel 34a and a second box side panel 34b. The above mentioned four elements extend approximately from one end of the structure 8 to the other along the X direction and can be made in a single piece or obtained by the assembly of several portions, without going outside the framework of the invention.

Moreover, the box 8 is provided with transverse ribs 36 each in the form of a frame and arranged along YZ planes, and at a spacing from each other along the X direction.

These ribs 36 define inter-rib spaces 38 and $38_1$ to $38_8$ each of which is therefore delimited at the forward and aft ends by two directly consecutive ribs 36, and also delimited by the spars 30, 32 and by the two side panels 34a, 34b.

Thus, in the preferred embodiment described, eight directly consecutive spaces (references $38_1$ to $38_8$) out of the twelve inter-rib spaces formed in the rigid structure 8 form a group 40 within which a single access opening is provided on the panels 34a, 34b for each of the spaces $38_1$ to $38_8$ concerned.

Furthermore, these openings are alternated/staggered, since they are located alternately on the first panel 34a and on the second panel 34b.

More precisely, as can be seen better in FIG. 2, the access opening $42_1$ located furthest forward in the group 40 of inter-rib spaces, in other words the space that leads directly into the space reference $38_1$, is formed on the first panel 34a. Then, working in the aft direction, the access opening $42_2$ located in the directly adjacent inter-rib space reference $38_2$ is formed on the second panel 34b. Still working in the aft direction, the access opening $42_3$ located in the directly adjacent inter-rib space reference $38_3$ is once again formed on the first panel 34a. Thus, this alternation/staggering in the arrangement of access openings is formed on the entire group 40, which means that the openings $42_4$, $42_6$, $42_8$ opening up directly into space references $38_4$, $38_6$, $38_8$ respectively are located in the second side panel 34b, and similarly the openings $42_5$ and $42_7$ open up into space references $38_5$ and $38_7$ respectively located in the first side panel 34a.

More generally, it can be arranged such that this group 40 on which this alternation of single openings is formed preferably contains at least 60% of all inter-rib spaces 38 and $38_1$ to $38_8$ formed in the rigid structure 8, which enables easier access to a large part of the rigid structure 8.

Each access opening $42_1$ to $42_8$ is circular in shape with a centre line approximately parallel to the Y direction, and with a radius of more than 200 mm.

Furthermore, it would also be possible for an access opening to be formed in one or both spars 30, 32 enabling access into the box. As shown as an example in FIG. 3, it is then possible to provide an access opening 44 on the upper spar 30 at the furthest forward inter-rib space $38_1$ in the group 40. Naturally, these openings could be formed so as to open up into an inter-rib space 38 that does not belong to the group 40, as show as an example with the access opening reference 46 and opening up in an inter-rib space forward from the abovementioned group.

Obviously, those skilled in the art can make various modifications to the suspension pylon 4 and to its rigid structure that have just been described, solely as non-limitative examples.

The invention claimed is:

1. A pylon comprising a rigid structure for an aircraft engine, the rigid structure being in a form of a box laterally closed on a first side by a first box side panel, and on a second side by a second box side panel, the rigid structure comprising:
transverse ribs connecting the first and second side panels and located at a spacing from each other along a longitudinal direction of the rigid structure; and
a plurality of inter-rib spaces, each space delimited by two directly consecutive transverse ribs,
wherein only one access opening into the inside of the box is provided in the side panels for each inter-rib space belonging to a group including at least three directly consecutive inter-rib spaces in the rigid structure, each of the access openings being arranged alternately on the first and the second side panels of the rigid structure.

2. The pylon according to claim 1, wherein the group including at least three arbitrary and directly consecutive inter-rib spaces includes at least eight inter-rib spaces.

3. The pylon according to claim 1, wherein the group including at least three arbitrary and directly consecutive inter-rib spaces includes at least 60% of all inter-rib spaces formed in the rigid structure.

4. The pylon according to claim 1, wherein each access opening is circular in shape and has a radius larger than 200 mm.

5. The pylon according to claim 1, wherein the access openings on each of the respective side panels are substantially collinear.

6. The pylon according to claim 1, further comprising an upper spar and a lower spar, and wherein at least one of the upper and lower spars includes at least one access opening allowing access to the inside of the box.

7. The pylon according to claim 6, wherein the at least one access opening in at least one of the upper and lower spars opens into an inter-rib space that is not part of the group.

8. The pylon according to claim 6, wherein the at least one access opening in at least one of the upper and lower spars is formed in an inter-rib space at a longitudinal end of the rigid structure.

* * * * *